(12) United States Patent
Paryani et al.

(10) Patent No.: US 12,403,780 B2
(45) Date of Patent: Sep. 2, 2025

(54) LOW COST FAST CHARGE CONTACTOR FOR HIGH VOLTAGE BATTERY MANAGEMENT SYSTEMS

(71) Applicant: Ford Global Technologies, LLC, Dearborn, MI (US)

(72) Inventors: Anil Paryani, Cerritos, CA (US); Andrew Almendares, Long Beach, CA (US); Jacob Swanson, Los Angeles, CA (US); Garrett Heinen, Long Beach, CA (US); Isaac Ng, San Gabriel, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/206,006

(22) Filed: Jun. 5, 2023

(65) Prior Publication Data

US 2023/0311678 A1 Oct. 5, 2023

Related U.S. Application Data

(63) Continuation of application No. PCT/US2021/019251, filed on Feb. 23, 2021.
(Continued)

(51) Int. Cl.
*B60L 50/60* (2019.01)
*B60L 53/10* (2019.01)
(Continued)

(52) U.S. Cl.
CPC ............ *B60L 53/11* (2019.02); *B60L 50/60* (2019.02); *B60L 53/16* (2019.02); *B60L 53/60* (2019.02);
(Continued)

(58) Field of Classification Search
CPC ............ B60L 2210/10; B60L 2250/16; B60L 2260/20; B60L 53/10; B60L 50/60;
(Continued)

(56) References Cited

U.S. PATENT DOCUMENTS

2009/0096410 A1 4/2009 Sakurai
2012/0105065 A1 5/2012 Namou et al.
(Continued)

OTHER PUBLICATIONS

International Search Report and Written Opinion in International Patent Application No. PCT/US2021/019251, mailed Jul. 29, 2021.
(Continued)

*Primary Examiner* — Elim Ortiz
(74) *Attorney, Agent, or Firm* — Enable IP P.C.

(57) ABSTRACT

A battery management system (BMS) connected to a battery having a positive end and a negative end, the BMS also connected to a fast charger. The BMS includes: a battery management controller protection circuit board (PCB) configured to manage an operation of the battery; a charger controller PCB configure to control fast charging of the battery; and a fast charge contactor positioned between one of the positive and negative ends of the battery and the fast charger. No fast charge contactor is positioned between the other of the positive and negative ends of the battery and the fast charger. The BMS is configured to determine a location of an isolation fault by connecting and disconnecting one or more resistors.

12 Claims, 9 Drawing Sheets

Related U.S. Application Data

(60) Provisional application No. 63/121,344, filed on Dec. 4, 2020.

(51) Int. Cl.
*B60L 53/16* (2019.01)
*B60L 53/60* (2019.01)

(52) U.S. Cl.
CPC ....... *B60L 2250/16* (2013.01); *B60L 2260/20* (2013.01); *E05Y 2400/10* (2013.01); *E05Y 2900/53* (2013.01)

(58) Field of Classification Search
CPC .......... B60L 53/11; B60L 53/16; B60L 53/20; B60L 53/60; E05Y 2400/10
See application file for complete search history.

(56) References Cited

U.S. PATENT DOCUMENTS

| | | | |
|---|---|---|---|
| 2013/0076059 A1* | 3/2013 | Zalan | B60L 53/16 49/386 |
| 2015/0115966 A1* | 4/2015 | Berman | B60L 3/0023 324/511 |
| 2015/0137755 A1 | 5/2015 | Sadano et al. | |
| 2015/0191088 A1 | 7/2015 | Gonzales et al. | |
| 2016/0261127 A1* | 9/2016 | Worry | H02J 7/0029 |
| 2018/0354383 A1 | 12/2018 | Namou et al. | |
| 2020/0282853 A1 | 9/2020 | Paryani | |

OTHER PUBLICATIONS

Written Opinion of the International Searching Authority for International Application No. PCT/US2021/19251, mailed Jul. 29, 2021.

* cited by examiner

LOW COST FAST CHARGE CONTACTOR FOR HIGH VOLTAGE BATTERY MANAGEMENT SYSTEMS

CROSS-REFERENCE TO RELATED APPLICATION

This application claims priority to PCT Application No. PCT/US2021/019251, filed on Feb. 23, 2021 and U.S. Provisional Patent Application Ser. No. 63/121,344, filed on Dec. 4, 2020, the disclosure of which is hereby incorporated by reference in their entirety.

FIELD

This relates to a high voltage Battery Management System (BMS) of a vehicle, and in particular, to a BMS including a main battery management controller protection circuit board (PCB) combined with an electric vehicle (EV) charger controller PCB to achieve a high level of functional safety, reliability, and lower cost.

BACKGROUND OF THE INVENTION

Typically, a high voltage BMS has two contactors or solid-state relay sets, on both positive and negative to disconnect the battery pack from the rest of the electric system of the vehicle. The contactors are there to protect the occupants, service, and rescue people from a fire a shock hazard when things go wrong, such as a vehicle crash, runaway charger or external short in the system.

FIG. 1 illustrates an exemplary conventional high voltage BMS 100 of an electric vehicle. The BMS 100 controls the usage and charging of battery pack 106. The battery pack 106 can be connected to a fast charger 116 via a fast charger connector 118. Two fast charge (FC) contactors (or solid-state relay sets) 102, 104 are positioned between the fast charger and the positive and negative ends 108, 110 of the battery pack 106, respectively, to connect and disconnect the battery 106 from the fast charger 116. The FC contactors 102, 104 are incorporated into the circuit to protect the user in case a hazardous condition such as a short is detected in the circuit.

The reasons why two FC contactors 102, 104 are required in the conventional BMS 100 illustrated in FIG. 1 is to provide redundancy—in case one contactor fails to open when it should because it is welded or shorted somehow or for any other well-known reasons, the other contactor on its own can still open to break the circuit. If there is only one FC contactor (e.g., contactor 102), there could still be a short connecting the positive side of the battery 102 to somewhere else in the circuit even when the contractor 102 is open. In addition, having two sets of FC contactors 102, 104 can also protect the system from a dual failure shock hazard which involves an isolation fault combined with undetected access to high voltage that with high voltage interlock false negative. Furthermore, two fast charge contactors avoid having high voltage present on the charge port pins that are charged through the y capacitors and can provide a shock hazard.

Additional sets of contactors 120, 122 (or fuse or pyro fuse) can also be added between the battery and other parts of the vehicle (e.g., main load 124) to protect against shorts and other hazardous situation in the electrical system. Again, the contactors 120, 122 are added in pair for redundancy and dual failure shock protection.

FIG. 1 also illustrates an electric vehicle charge controller (EVCC) 114 external to the BMS 100. This type of EVCC is referred to as a standalone EVCC hereinafter. The EVCC 114 controls and drives the charge port latch, connector latch, and PLC and CAN communications between vehicle and electric Vehicle service equipment (EVSE). The EVCC 114 is a separate module from the BMS in the setup of FIG. 1. The vehicle also includes a vehicle control unit (VCU) 112 that handles vehicle system level controls. When failures or misuse occurs, the conventional system illustrated in FIG. 1 relies on the combination of the BMS 100, VCU 112, and EVCC 114 to handle the decision making to prevent or mitigate any potential hazardous situation. An example of a potential hazardous situation is if the user turns on the car and attempts to drive away with the charge plug still plugged into the charge port.

There are a number of problems with the conventional setup illustrated in FIG. 1. First, to achieve a high level of functional safety is complicated due to trust requirements and time consuming as many safe, secure, and verifiable handshakes between the VCU 112, EVCC 114 and BMS 100 need to occur as they are separate modules in the vehicle and communicate with each other via buses. Therefore, extra redundancy of contactor sets is employed as illustrated in FIG. 1.

Second, as specified in Federal Motor Vehicle Safety Standards (FMVSS) 305 (see FIG. 2, FMVSS 305 Excerpt), existing BMS isolation algorithms do not specify the location of the isolation fault. Without the location known, it is harder to ascertain if a positive weld or negative weld contactor fault creates the hazard.

Third, contactors such as FC contactors 102, 104 of FIG. 1 are expensive, space consuming (see example shown in FIG. 3), and unreliable as they weld due to over-heat.

Fourth, the coil drive circuits and the wires to the contactors are prone to failure.

Finally, contactors are noisy, when opening and closing, and resonate high frequency audible sounds when handling significant current (>300 A typically).

Accordingly, it would be desirable to reduce the number of contactors in the BMS without compromise the functional safety of the vehicle.

SUMMARY OF THE INVENTION

In the embodiments of the present disclosure, the EVCC function is moved into the BMS or On Board Charger and one of the FC contactors is eliminated. These combined with software controls allows the same functional safety level as before, but with reduced cost (by eliminating controllers and wiring) and improved reliability, due to less wiring. Optionally, the EVCC can be external to the BMS and communicate to the BMS over a reliable CAN bus or equivalent. The remaining FC contactor can also be in parallel with the positive or negative contactor. Also, the DC-DC and other loads can have one or more legs inside one of the contactors, if high voltage on the charge port is not desired as shown in FIG. 9. The advantage of putting the DC-DC or compressor or high voltage heater in this configuration is when the charge port door is open, those aux systems can be powered on, without high voltage being exposed on the charge port door pins.

DETAILED DESCRIPTION

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to automotive systems, some of which are illustrated by way of example in the figures and in the following description of the preferred aspects. The detailed description and drawings are merely illustrative of the disclosure rather than limiting, the scope of the disclosure being defined by the appended claims and equivalents thereof.

Acronyms

Figure 1:
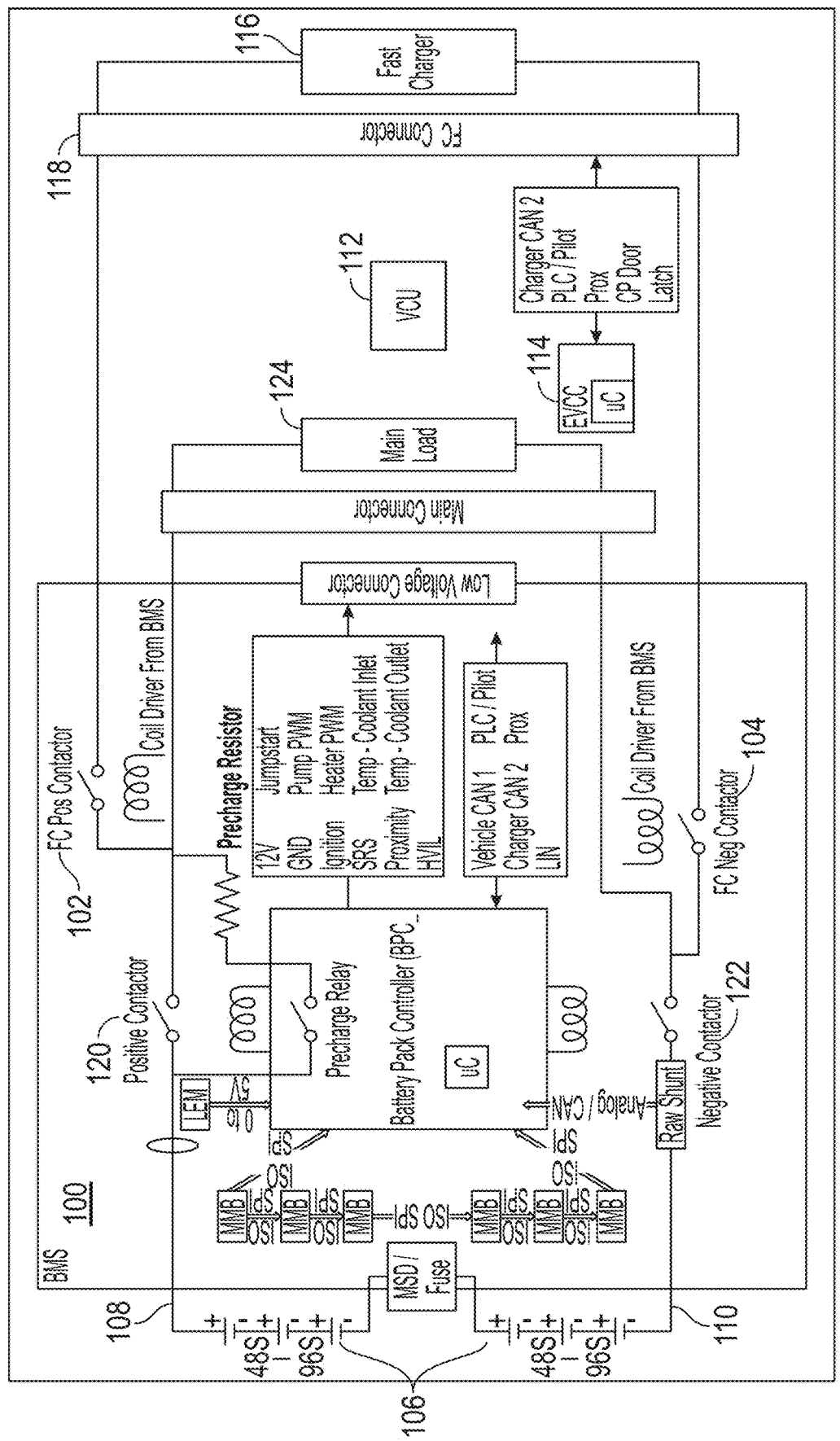
FIG. 1 is a block diagram illustrating an exemplary conventional high voltage BMS of an electric vehicle.
Figure 2:
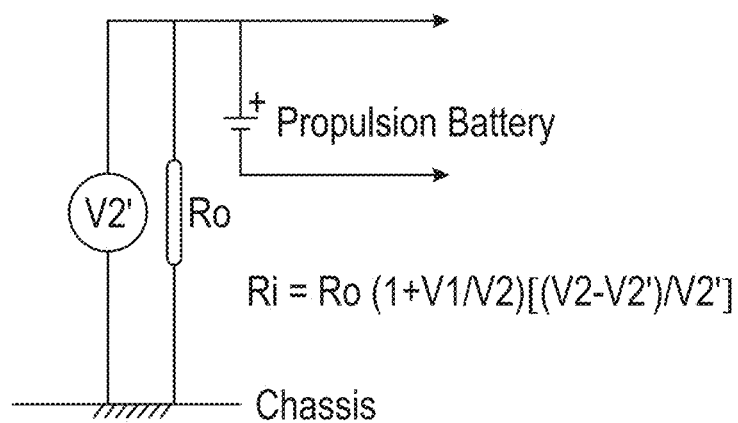
FIG. 2 illustrates an Excerpt of FMVSS 305.
Figure 3:
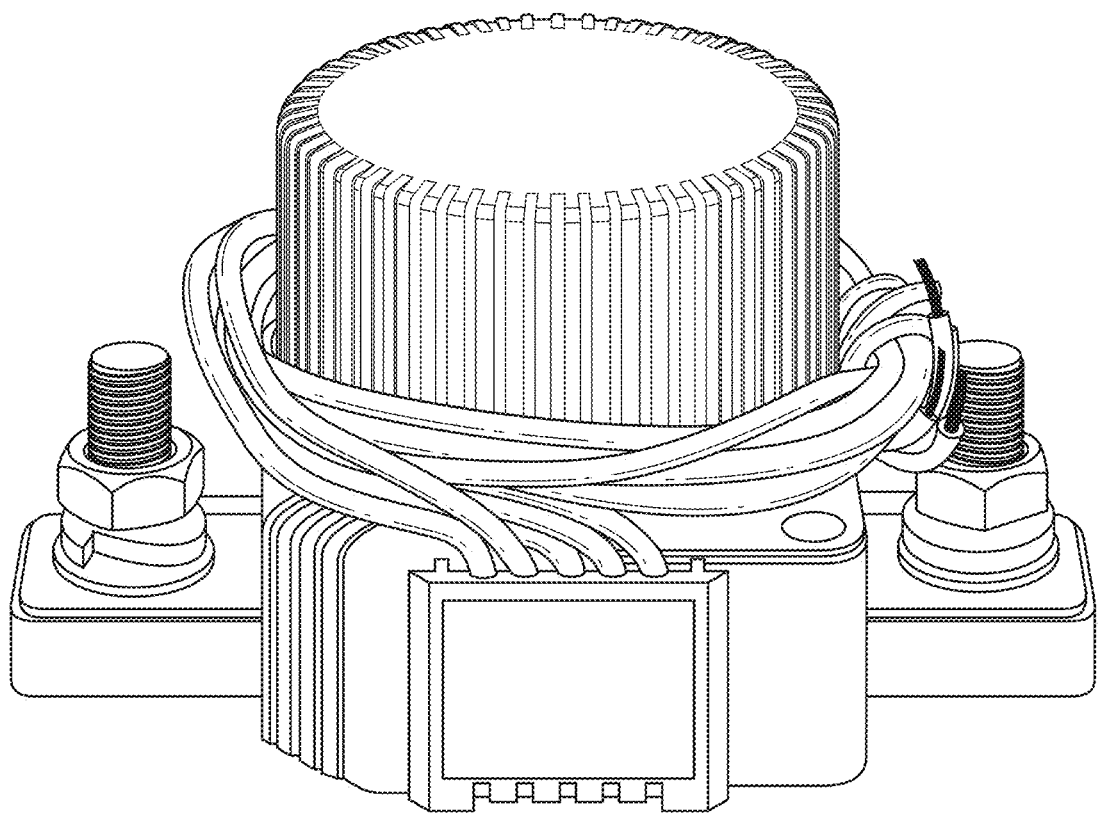
FIG. 3 is a picture of an actual contactor.

BMS—Battery Management System
BPC—Battery Pack Controller
CAN—Controller Area Network
CCS—Combo Charge Standard
CP—Charge Port
DC—Direct Current
ECU—Electronic Control Unit
EV—Electric Vehicle
EVCC—Electric Vehicle Charge Controller
EVSE—Electric Vehicle Service Equipment
FC—Fast Charging
GB/T—GB/T Chinese standard charging connection
HV—High Voltage (>48V)
MMB—Module Monitoring Board
OEM—Original Equipment Manufacturer
PCB—Protection Circuit Board
PLC—Power Line Communications
VCU—Vehicle Control Unit
ECU—Electronic Control Units Embodiments of the disclosure provide advantages over the conventional BMS illustrated in FIG. 1 by reducing complexity and cost without sacrificing functional safety. This is achieved by eliminating one of the FC contactors combined with updated software controls such as improved isolation algorithm to determine the location of the isolation fault. Additionally, functions provided by the conventional EVCC can be consolidated within the BPC of the BMS to reduce wiring and the number of controllers, which, in turn, can improve reliability of the system. Furthermore, the charge port (CP) locking mechanism can be utilized by the BMS as an additional safety feature to prevent hazardous conditions that may cause damage to the vehicle and/or injury to the user. As referred to hereinafter, a contactor such as an FC contactor can be any switch, electro-mechanical or completely solid-state or other.

Figure 4:
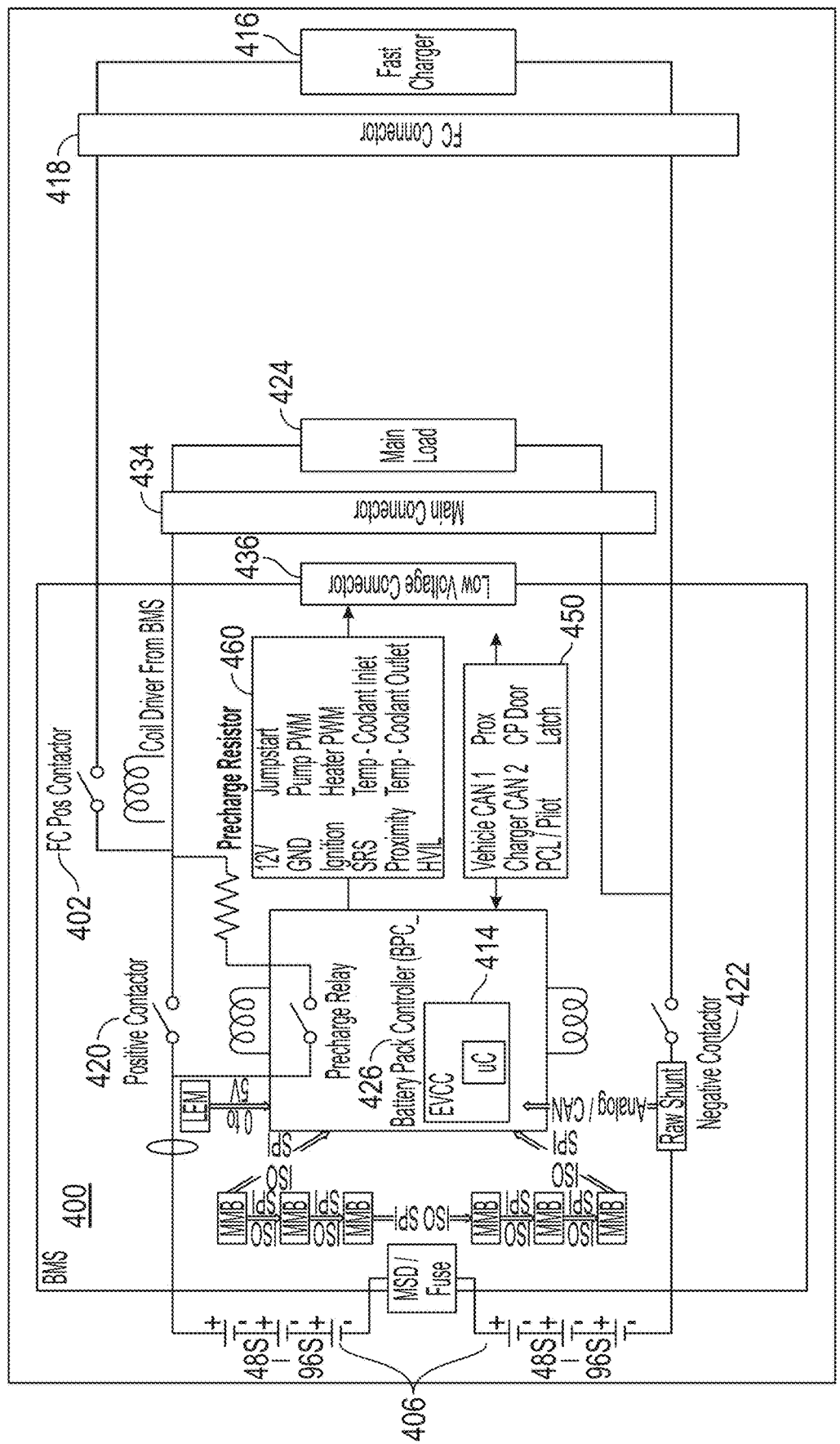
FIG. 4 is a block diagram illustrating an exemplary high voltage BMS of an electric vehicle, according to an embodiment of the disclosure.

FIG. 4 is a block diagram illustrating the exemplary component of a BMS, according to an embodiment of the disclosure. The BMS 400 is connected to a battery pack (or simply "the battery") 406. The battery 406 can be a single phase direct current (DC) source or any other battery suitable for powering an EV. The battery 406 can use any type of battery cells in any arrangement (e.g., strings). In some embodiments, the battery 406 can be a rechargeable electric vehicle battery or traction battery used to power the propulsion of an electric vehicle including the drive system.

The BMS 400 can comprised of fuses, switches, monitoring boards, current sensors, and controllers with communications. As illustrate, the BMS 400 can be in communication with one or more vehicle controller area networks (CANs), power line communications (PLCs) used in SAE, ISO EV charge standards, various latches of the vehicle, and the locking mechanism of the charge port door 450. The BMS 400 can also control via a low voltage connector 436 the electric power to a low voltage battery (e.g., 12V battery), ignition, heater, pump, coolant inlet/outlet and various other components of the vehicle 460. Connectors 420, 422 can connect and disconnect the battery 406 from the main load 424 of the vehicle via a main connector 434.

The BMS 400 can receive data from the battery pack 406 and generate control signals to manage the usage and charging of the battery pack 406 in a safe and reliable manner. For example, the BMS 400 may constantly monitor the battery state of charge (SOC) and state of health (SOH). The BMS 400 can detect a fault in the battery 406, such as over temperature, overcurrent, overvoltage, undervoltage, loss of voltage monitoring, or loss of isolation. In response to detecting a fault, the BMS 400 may cause the faulty part of the battery 400 to be disconnected from a direct current (DC) bus. The BMS 400 may also manage charging of the battery 406.

One difference between the BMS 400 of FIG. 4 and the traditional BMS 100 of FIG. 1 is that there is only one FC contactor 402 connecting the positive end of the battery pack 406 to the fast charger 416 via a FC connector 418. There is no FC contactor connecting the negative end of the battery 406 to the fast charger 416. In an alternative embodiment, the sole FC connector can be positioned at the negative end of the battery 406 instead and there would be no FC connector positioned at the positive end of the battery 406. That is, one of the FC connectors from the traditional BMS of FIG. 1 is eliminated. To be able to provide the same level of redundancy and protection against a dual failure shock hazard with one fewer FC contactor, the BMS 400 of FIG. 4 can be programmed with an improved isolation algorithm to determine the location of the isolation fault as shown in FIG. 8.

Figure 8:
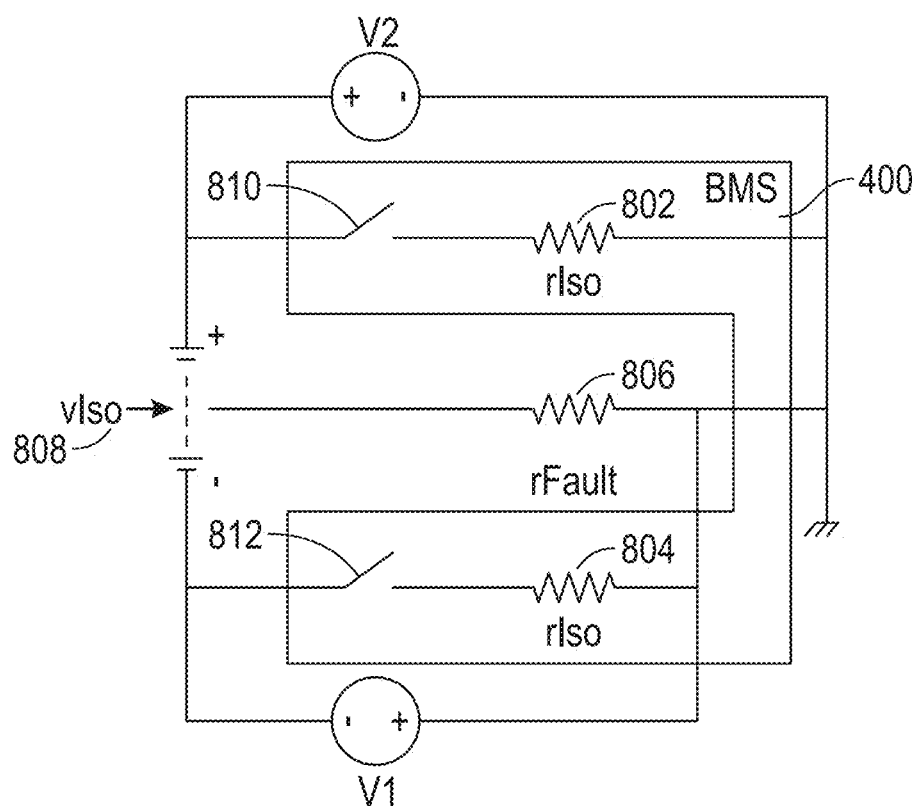
FIG. 8 is a circuit diagram illustrating an exemplary isolation circuit model, according to an embodiment of the disclosure.

As illustrated in FIG. 8, the BMS 400 can include 2 high impedance resistors, rlso 802, rlso 804. These rlsos 802, 804 can be resistors with known precise resistances. Rlso 802 can be turned on (or connected) by closing the isolation test switch 810. Rlso 804 can be turned on (or connected) by closing the isolation test switch 812. When there is no fault (e.g., rFault 806 does not exist), voltage vlso 808 should have an expected value based on the known resistances of the rlsos 802, 804 when either one of the rlsos 802 804 or both are turned on. When there is a fault (e.g., rFault 806) such as a short in the circuit, vlso 808 will not have the exact expected value. In one embodiment, the algorithm can solve for vlso 808 using elementary circuit analysis. Alternatively, vlso 808 can be measured directly by a voltage sensor, considering known leakage resistance or by closing both isolation test switches, using, for example, the formula below:

$$vlso = v1/(v1+v2)*vPa; \text{ where } vPa \text{ is the voltage of the battery}$$

In another embodiment, current can be measured instead of voltage using the same basic method described above to determine the location of the isolation fault.

With the improved isolation algorithm discussed above, the BMS 400 is able to provide redundancy and dual failure shock protection with only one FC contactor instead of two in the conventional design. Because contactors are expensive, space consuming, often unreliable, and noisy, many benefits can be had by eliminating one of the FC contactors.

Referring again to FIG. 4, another difference between the BMS 400 of FIG. 4 and the traditional BMS 100 of FIG. 1 is that the standalone EVCC module is eliminated and effectively consolidated within the BPC 426 of BMS 400. The EVCC 414 manages the charging of the vehicle and is only needed when the vehicle is charging. Typically, as shown in FIG. 1, EVCC is added to an existing vehicle as a standalone module, separate from the BMS. By consolidating it into the BMS, cost reduction and optimization can be achieved.

Alternatively, if the EVCC 414 needs to be external to the BMS 400 due to OEM considerations, that can still work provided vital information is still communicated about the charge port door. The charge port can be comprised of a CCS or GB/T or other connect, a door that can be locked/unlocked, a sensor that can determine the charge door position and state, and a lock to hold the couple in place. The charge port door lock mechanism, when locked, can hide and/or block the charge port from being used (e.g., connected to a charger). The charge port door can also include an optional automatic shut feature.

The status of the charge port door (e.g., whether locked or unlocked) can be communicated to the BPC 426. To prevent a shock hazard, in case of a contactor weld (or positive contactor) the BPC 426 will detect that, as normal. However, in this weld case, if the BPC detects an isolation fault, the BPC 426 can hold the charge port door shut and allow DC fast charge as normal. Note that, having a high voltage present on charge pins is not a hazard by itself, because the battery is normally isolated. The BPC 426 can turn off the isolation check when the charge port is open to prevent any chance of a hazardous event. The BPC 426 can ensure that the isolation check has been completed before the charge port door is about to be open.

Figure 9:
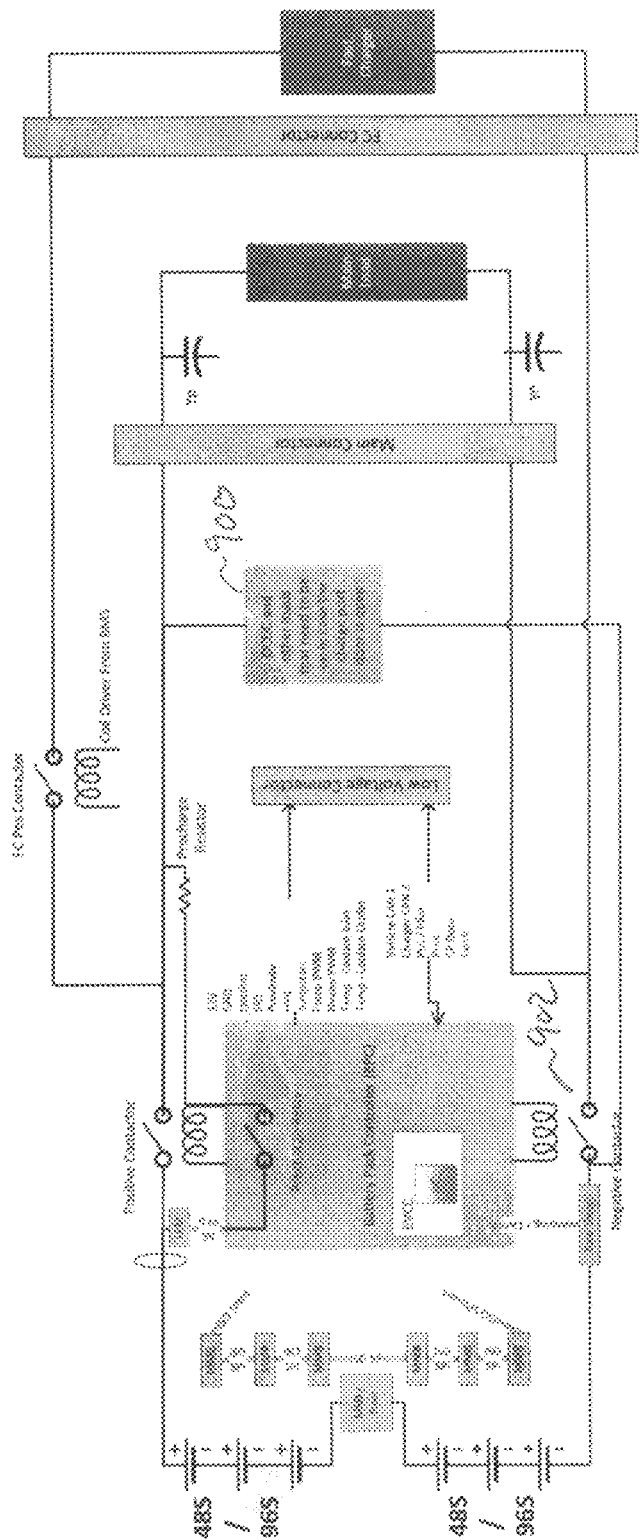
FIG. 9 is a block diagram illustrating an exemplary high voltage BMS of an electric vehicle, according to an embodiment of the disclosure.

In another embodiment illustrated in FIG. 9, the DC-DC and other loads 900 can have one or more legs inside one of the contactors 902, if high voltage on the charge port is not desired as shown in FIG. 9. The advantage of putting the DC-DC or compressor or high voltage heater 902 in this configuration is when the charge port door is open, those aux systems can be powered on, without high voltage being exposed on the charge port door pins.

Figure 5:
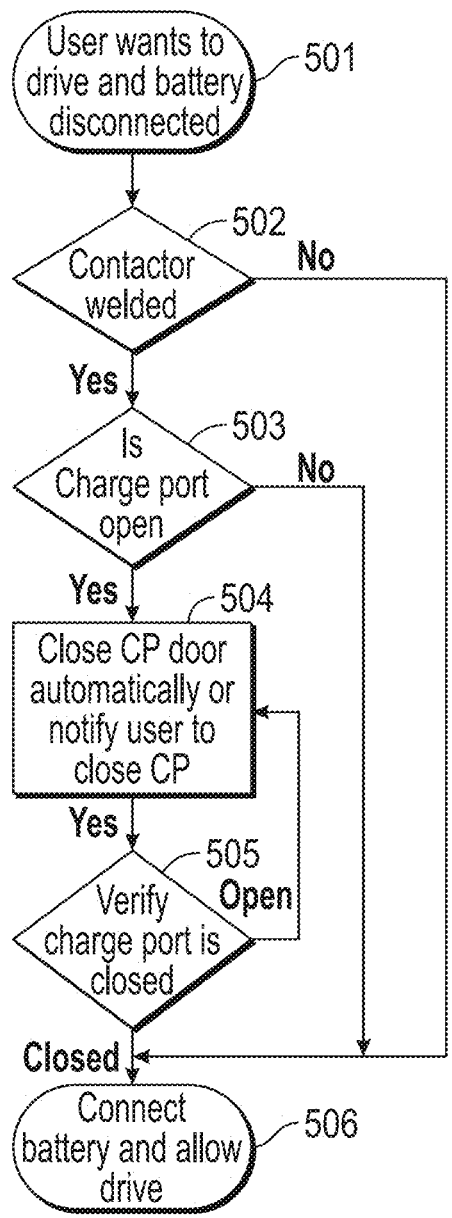
FIG. 5 is a flowchart illustrating the exemplary steps performed by an ECU for drive, according to an embodiment of the disclosure.

FIG. 5 is a flowchart illustrating the exemplary steps performed by an ECU for drive. The ECU is an embedded system in automotive electronics that controls one or more of the electrical systems or subsystems in a vehicle. When the user wants to drive the vehicle and the battery (e.g., battery 406 of FIG. 4) is disconnected (step 501), the BMS (e.g., BMS 400 of FIG. 4) checks if the FC contactor (e.g., FC contactor 402 of FIG. 4) is welded (step 502). If the FC contactor is not welded, the battery (e.g., battery 406) can be connected to allow drive (step 506). If the contactor is welded, the BMS checks if the charge port door is open (step 503). In a conventional setup such as the one shown in FIG. 1, step 503 is performed by the standalone EVCC. Here, the standalone EVCC no longer exists and the BMS takes over performing the status check of the charge port door. If the charge port door is determined to be closed, the battery is connected to allow drive (step 506). If the charge port door is open, the BMS can close the charge port door automatically (step 504). This is another step that is typically performed by a standalone EVCC of the vehicle and is now taken over by the BMS. Alternatively, the infotainment system of the vehicle can notify the user to close the charge port door manually.

Next, the BMS determines if the charge port door is closed (step 505). Again, this step is typically performed by the standalone EVCC in the conventional setup. If the charge port door is closed, the battery can be connected to allow drive (step 506). If the charge port door is detected to be open, the process can go back to step 504 where the BMS can close the charge port door automatically or the infotainment system of the vehicle can notify the user to close the charge port door.

The process of FIG. 5 can prevent a user from driving the vehicle when either the charge port door is open or the FC contactor is welded. This is a functional safety feature. By having the BMS rather than a standalone EVCC perform a number of the steps in FIG. 5, the embodiment reduces cost, complexity, and number of communications between the components when compared to the traditional mechanism.

Figure 6:
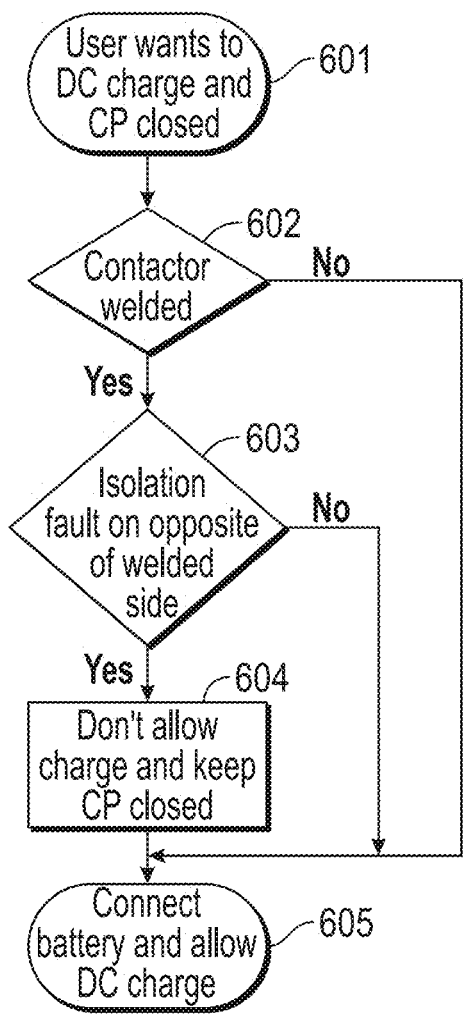
FIG. 6 is a flow chart illustrating the exemplary steps in determining whether to allow DC charging of a vehicle, according to an embodiment of the present disclosure.

FIG. 6 is a flow chart illustrating the exemplary steps in determining whether to allow DC charging of a vehicle, according to an embodiment of the present disclosure. When the user wants to DC charge the vehicle and the charge port door is closed (step 601), the BMS (e.g., BMS 400 of FIG. 4) determines if the contactor (e.g., FC contactor 402 of FIG. 4) is welded (step 602). If not, the battery (e.g., battery 406 of FIG. 4) is connected to allow DC charge (step 605). If the contactor is determined to be welded, the BMS checks if there is an isolation fault on the opposite of the welded side (step 603). This can done using the method discussed above with reference to FIG. 8. This step 606 is not performed in the conventional BMS (e.g., BMS 100 of FIG. 1) due to the BMS having an extra FC contactor as shown in FIG. 1. If there is no isolation fault, the battery is connected to allow DC charge (step 605). If the BMS determines that there is an isolation fault on opposite of welded side, the BMS and/or the infotainment system of the vehicle are configured to disable charging and keep the charge port door closed (step 604). Traditionally, this step is performed by a standalone EVCC, which is consolidated into the BMS in the present embodiment.

The process of FIG. 6 can prevent a user from DC charging the vehicle by locking or keeping the charge port door locked when the FC contactor is welded and an isolation fault is detected on the opposite of the welded side. This is another functional safety feature that can prevent injury to the user. Again, by having the BMS perform all the steps in FIG. 6 and eliminating the need of a standalone EVCC, the disclosed embodiment reduces cost, complexity, and number of communications between the components when compared to the conventional system.

Figure 7:
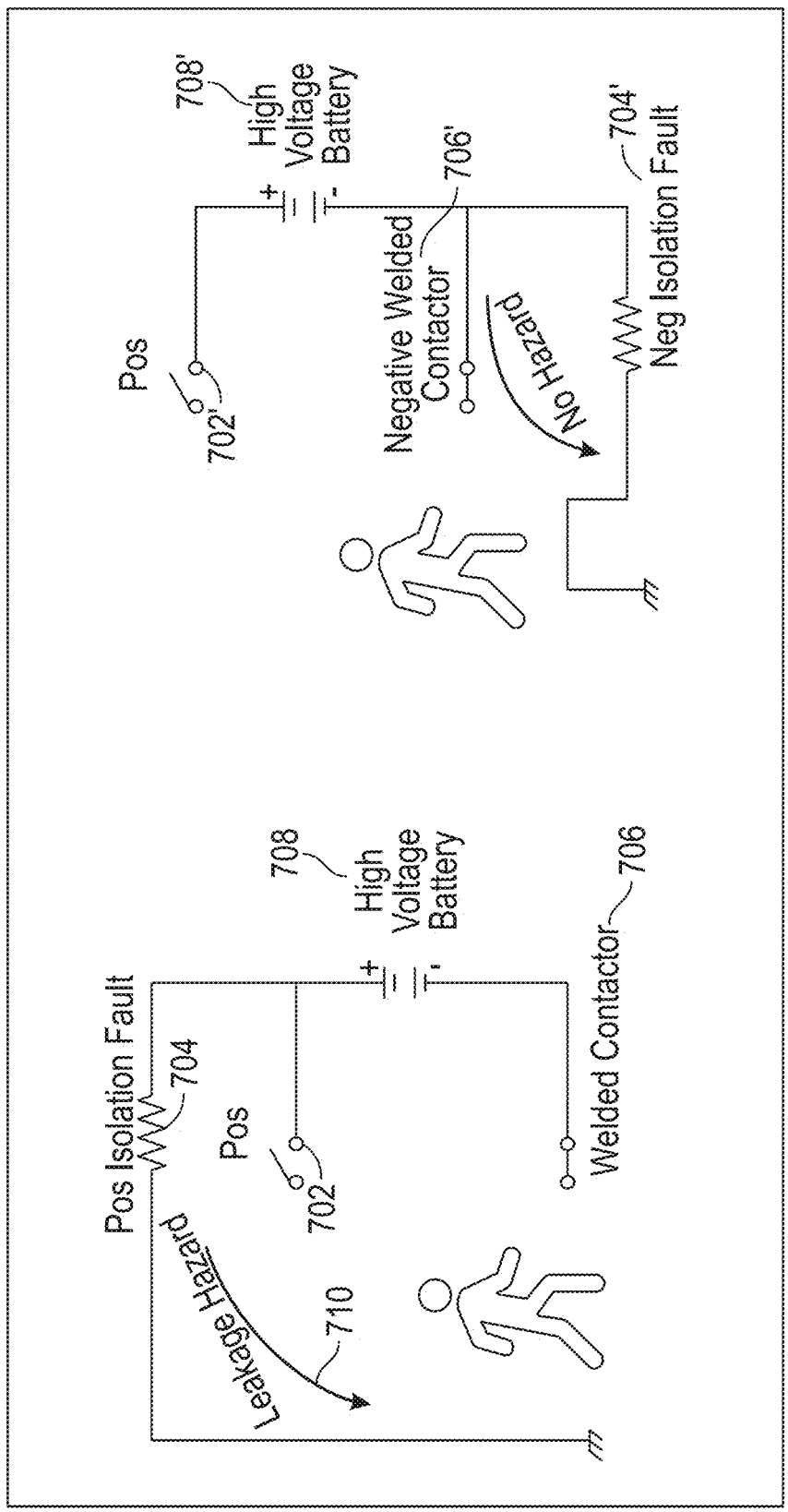
FIG. 7 illustrates an exemplary location of the isolation fault creating the shock hazard.

FIG. 7 illustrates an exemplary location of the isolation fault creating a shock hazard. As illustrated, when there is no contactor or a welded contactor 706 at the negative end of the battery 708, even if the contactor at the positive end of the battery 708 is not welded, an isolation fault on the positive side can cause leakage hazard 710. In comparison, when the isolation fault 704' is at the negative end of the battery 708' and there is no contactor or the contactor 706' is welded at the negative end of the battery 708', there is no hazard with the contactor 702' on the positive end of the battery 708'.

The embodiments discussed above can be incorporated in any electric vehicle (EV). As referred to herein, an EV can be any type of vehicle at least partially powered by electrical power. For example, vehicle may be a pure electric vehicle or a hybrid vehicle. Vehicle may have any body style, such as a sedan, a coupe, a sports car, a truck, a station wagon, an SUV, a minivan, or a conversion van.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A battery management system (BMS) of a vehicle, the BMS connected to a battery having a positive end and a negative end, the BMS also connected to a fast charger, the battery powers a main load, the vehicle having a lockable charge port door, the BMS comprising:
   a battery management controller protection circuit board (PCB) configured to manage an operation of the battery;
   a charger controller PCB configure to control fast charging of the battery;
   a first contactor positioned between a positive end of the battery and the main load;
   a second contactor positioned between a negative end of the battery and the main load; and
   a fast charge (FC) contactor positioned between one of the first contactor and the second contactor and the fast charger;
   wherein the fast charge contactor is configured to disconnect the fast charger from the battery when the first contactor and the second contactor are both in closed state; and
   wherein the BMS is configured to determine a location of an isolation fault by connecting and disconnecting one or more resistors.

2. The BMS of claim 1, wherein the fast charge contractor is positioned between the positive end of the battery and the fast charger.

3. The BMS of claim 1, wherein the BMS is further configured to determine that the FC contactor is welded.

4. The BMS of claim 3, wherein the BMS is further configured to allow the charge port door to open if the FC contactor is determined not to be welded and keep the lockable charge port door closed if the FC contactor is determined to be welded.

5. The BMS of claim 4, wherein determining whether it is safe to open the lockable charge port door is based on the location of the isolation fault.

6. The BMS of claim 1, further comprising high voltage loads that need to be active when the lockable charge port door is open, on one of battery contactor legs with the fast charge contactor positioned on an opposite leg of the battery between the fast charger.

7. A method of determining whether to allow drive of a vehicle powered by a battery that is managed by a battery management system (BMS), the vehicle including a charge port door, which, when closed, prevents the vehicle from being charged, the method comprising: the BMS
   receiving user input to put the vehicle in a drive mode;
   detecting the battery being disconnected;
   when a fast charge contactor positioned between the battery and a fast charger is not welded, connect the battery and put the vehicle in drive mode;
   when the fast charge contactor is welded but the charge port door is closed, connect the battery and put the vehicle in drive mode; and
   when the fast charge contactor is welded and the charge port door is open, cause the charge port door to be closed, and connect the battery and put the vehicle in drive mode after the charge port door is closed.

8. The method of claim 7, wherein causing the charge port door to be closed comprising the BMS automatically closing the charge port door.

9. The method of claim 7, wherein causing the charge port door to be closed comprising prompting the user to close the door via an infotainment system of the vehicle.

10. The method of claim 7, wherein the fast charge contactor is positioned between the positive end of the battery and the fast charger and there is no fast charge contactor between the negative end of the battery and the fast charger.

11. A method of managing direct current (DC) charging of a vehicle powered by a battery that is managed by a battery management system (BMS), the vehicle including a charge port door, which, when closed, prevents the vehicle from being charged, the method comprising: the BMS
   receiving user input to DC charge the battery;
   detecting the charge port door closed;
   when a fast charge contactor positioned between the battery and a fast charger is not welded, connect the battery, open the charge port door and allow DC charging of the vehicle;
   when the fast charge contactor is welded but there is no isolation fault on opposite of the welded fast charge contactor, open the charge port door and allow DC charging of the vehicle; and when the fast charge contactor is welded and there is an isolation fault on opposite of the welded fast charge contactor, keep the charge port door closed to prohibit DC charging of the vehicle until the isolation fault is resolved or the fast charge contactor is no longer welded.

12. The method of claim 11 further comprising providing a warning to the user via an infotainment system of the vehicle that it is unsafe to charge the vehicle if the fast charge contactor is welded and there is an isolation fault on opposite of the welded fast charge contactor.

* * * * *